US009007366B2

(12) United States Patent
Yang

(10) Patent No.: US 9,007,366 B2
(45) Date of Patent: Apr. 14, 2015

(54) 3D TV DIMMING SYSTEM AND DIMMING METHOD

(71) Applicant: Shenzhen China Star Optoelectronics Technology Co., Ltd., Shenzhen (CN)

(72) Inventor: Xiang Yang, Shenzhen (CN)

( * ) Notice: Subject to any disclaimer, the term of this patent is extended or adjusted under 35 U.S.C. 154(b) by 161 days.

(21) Appl. No.: 13/698,998

(22) PCT Filed: Oct. 25, 2012

(86) PCT No.: PCT/CN2012/083491

§ 371 (c)(1),
(2) Date: Nov. 20, 2012

(87) PCT Pub. No.: WO2014/047998

PCT Pub. Date: Apr. 3, 2014

(65) Prior Publication Data

US 2014/0092071 A1 Apr. 3, 2014

(30) Foreign Application Priority Data

Sep. 29, 2012 (CN) .......................... 2012 1 0374818

(51) Int. Cl.
*G06T 15/00* (2011.01)
*G09G 3/36* (2006.01)

(52) U.S. Cl.
CPC .................................... *G09G 3/3611* (2013.01)

(58) Field of Classification Search
CPC ...................................................... H05B 41/24
USPC ........................... 315/250; 345/211, 419, 690
See application file for complete search history.

(56) References Cited

U.S. PATENT DOCUMENTS

2010/0033555 A1 2/2010 Nagase et al.
2010/0052558 A1 * 3/2010 Lee et al. ...................... 315/250

FOREIGN PATENT DOCUMENTS

CN 101076845 A 11/2007
CN 102163408 A 8/2011
CN 102395230 A 3/2012
CN 102510047 A 6/2012
CN 102523406 A 6/2012
CN 102695074 A 9/2012

OTHER PUBLICATIONS

Zhao Wei Hua, The International Searching Authority written comments, Jun. 2013, CN.

* cited by examiner

*Primary Examiner* — Claire X Pappas
*Assistant Examiner* — Abdul-Samad A Adediran

(57) ABSTRACT

A three-dimensional (3D) television (TV) dimming system includes a TV control board, a light bar load controlled by the TV control board, and a power board that supplies power to the light bar load. The TV control board is directly coupled with the power board, and the TV control board feeds back the 3D signal to the power board when the TV control board outputs a 3D signal.

9 Claims, 2 Drawing Sheets

3D TV DIMMING SYSTEM AND DIMMING METHOD

TECHNICAL FIELD

The present disclosure relates to the field of liquid crystal displays (LCDs), and more particularly to a three-dimensional (3D) television (TV) dimming s stem and a dimming method.

BACKGROUND

In a three-dimensional (3D) television (TV) system, images displayed to an left eye and an right eye of a user are different, therefore, backlight dimming for displaying a three-dimensional (3D) signal is different with backlight-dimming for displaying a two-dimensional (2D) signal.

As shown FIG. 1, in a TV system, a motherboard 5 sends a 3D signal to a TV control board 2, and the TV control board 2 controls a converter 3 to dim in accordance with a defined DUTY and DELAY signal after the TV control board 2 receives the 3D signal. At this moment, both current and voltage of a light bar 4 (light source) change suddenly, and the converter 3 and a power board 1 both require a dynamic response speed to meet a momentary load change (the current and voltage change of the tight bar). However, the entire power system is instable and oscillates if the response speed is blindly adjusted. Therefore, the response speed of the entire power system needs to be faster in another mode.

SUMMARY

In view of the above-described problems, the aim of the present disclosure is to provide a three-dimensional (3D) television (TV) dimming system and a dimming method thereof with high response speed.

The aim of the present disclosure is achieved, by the following technical scheme. A three-dimensional (3D) television (TV) dimming system, comprising:

a TV control board;

a light bar load controlled by the TV control board; and a power hoard that supplies power to the light bar load.

The TV control board is directly coupled to the power board, and the TV control board feeds back the 3D signal to the power board when the TV control board outputs a 3D signal.

The power board comprises a first comparator, a second comparator, a third comparator, and an output circuit. An output ends of the first comparator and an output ends of the second comparator are coupled to an input end of the third comparator, an input end of the first comparator is coupled to the TV control board, and an output end of the third comparator is coupled to an input end of the output circuit.

The output circuit comprises a fourth comparator coupled to the output end of the third comparator, and a trigger coupled to an output end of the fourth comparator.

The light bar load comprises a light bar and a converter. The converter is coupled to an output end of the TV control board, and the TV control board sends the 3D signal to the converter when the TV control board feeds back the 3D signal to the power board.

The aim of the present disclosure is further achieved by the following technical scheme. A three-dimensional (3D) television (TV) dimming system comprises a TV control board, a light bar load controlled by the TV control board, and a power board that supplies power to the light bar load. The TV control board is directly coupled to the power board, and the TV control board feeds back the 3D signal to the power board when the TV control board outputs a 3D signal.

In one example, the power board comprises a first comparator, a second comparator, a third comparator, and an output circuit. An output ends of the first comparator and an output ends of the second comparator are coupled to an input end of the third comparator, the input end of the first comparator is coupled to the TV control board, and an output end of the third comparator is coupled with an input end of the output circuit.

In one example, the output circuit comprises a fourth comparator coupled to the output end of the third comparator, and a trigger coupled to an output end of the fourth comparator.

In one example, the light bar load comprises a light bar, and a converter. The converter is coupled to an output end of the TV control board, and the TV control board sends the 3D signal to the converter when the TV control board feeds forward the 3D signal to the power board.

In one example, the 3D signal is a high level/low level identification potential.

A 3D TV dimming method comprises the following steps:

The TV control board sends the 3D signal to the light bar load to dim when the TV control board outputs a 3D signal, and the TV control board feeds back the 3D signal to the power board.

In one example, the TV control board sends the 3D signal to the power board and the light bar load when the TV control board outputs a 3D signal.

In one example, the TV control board sends the 3D signal to the power board before sending the 3D signal to the light bar load when the TV control board outputs a 3D signal. The power board adjusts the output of the power hoard in advance when the 3D signal is sent to the power board in advance to output corresponding voltage.

In one example, the power board comprises a first comparator, a second comparator, a third comparator, and an output circuit. The first comparator receives the 3D signal sent by the TV control hoard and outputs a first comparison signal according to a comparison of the 3D signal with one reference voltage. The second comparator receives a dimming signal fed back by the light bar load and outputs a first comparison signal according to a comparison of the dimming signal with another reference voltage. A third comparison signal is output to control output of the power board after the first comparison signal and the second comparison signal are compared by the third comparator.

In one example, the output circuit comprises a fourth comparator, and it trigger coupled to an output end of the fourth comparator. The third comparison signal is sent to the fourth comparator and compared with a triangular wave signal, then the fourth comparator outputs a trigger signal to the trigger that directly controls the output of the power board.

In the present disclosure, because the TV control board sends the 3D signal to the power board in advance, the power board can make corresponding output adjustment in advance without waiting the dimming signal of the light bar load, which makes the dynamic response speed of the power board to be faster, and does not affect stability of a loop circuit.

Legends: 1. power board; 2. TV control board; 3. converter; 4. light bar; 5. motherboard.

DETAILED DESCRIPTION

The present disclosure will be described in detail in accordance with the figures and the examples.

Figure 1:
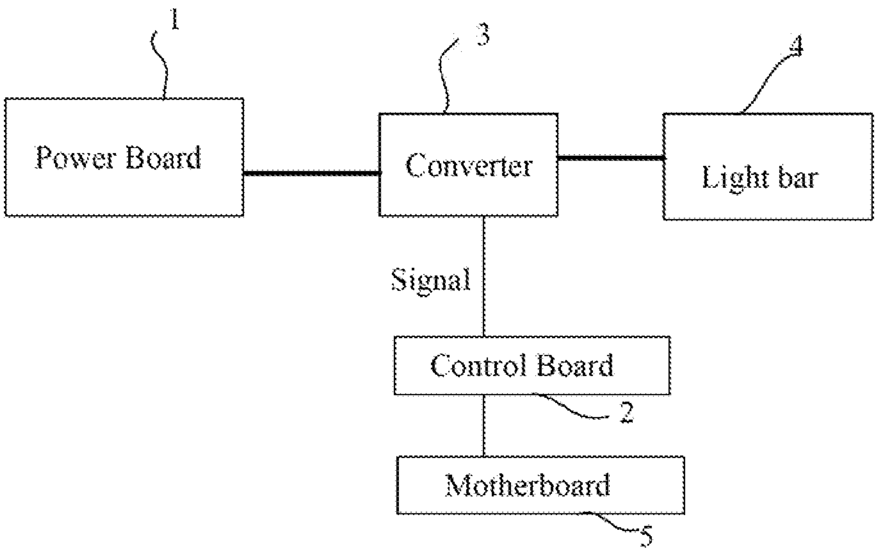
FIG. 1 is a block diagram of a typical dimming system of the present disclosure.
Figure 2:
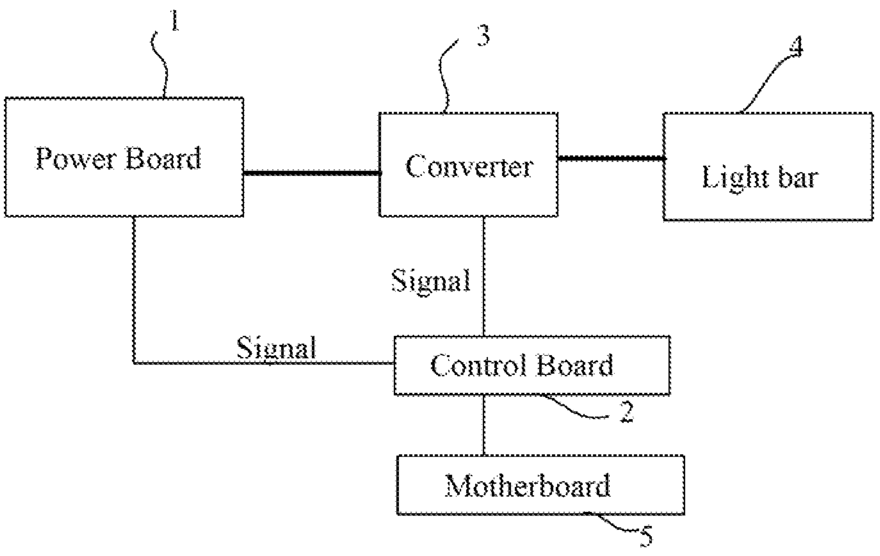
FIG. 2 is a block diagram of a dimming system of an example of the present disclosure.
Figure 3:
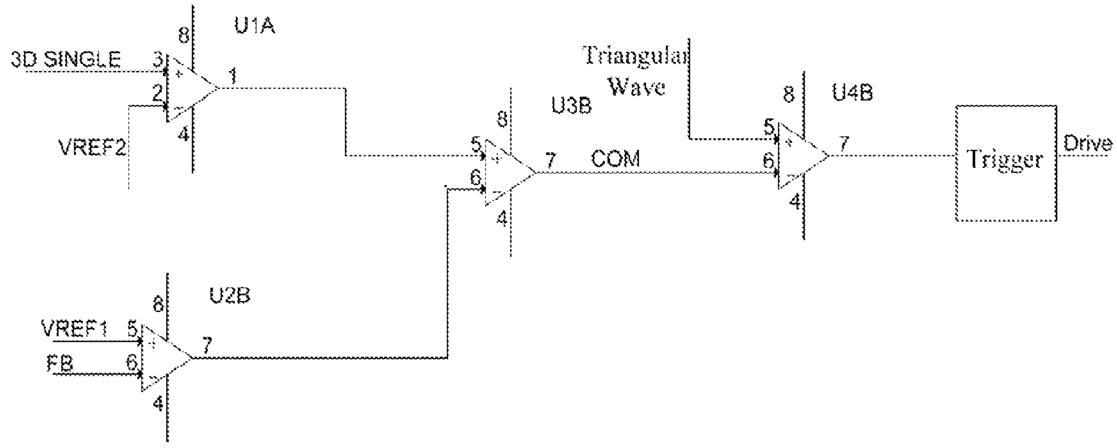
FIG. 3 is a circuit diagram of a power board of an example of the present disclosure.

The present disclosure provides a three-dimensional (3D) television (TV) dimming system and a dimming method. FIG. 2 and FIG. 3 show a first example of the system and method. The dimming system comprises a TV control board 2, a light bar load controlled by the TV control board 2, and a power board 1 that supplies power to the light bar load. The TV control board 2 is directly coupled to the power board 1, and the TV control board 2 feeds backs the 3D signal to the power board 1 when the TV control board 2 outputs a 3D signal. As shown in FIG. 2, a circuit that sends the 3D signal to the power board 1 is arranged between the power board 1 and the TV control board 2. When the signal input by the TV is to 3D signal, the TV control board 2 sends the 3D signal to the power board 1 by the circuit. Thus, the power board 1 can adjust the output of the power board in advance, which make the dynamic response speed of the power board 1 to be faster.

In the example, the TV control board 2 sends the 3D signal to the power board 1 and the light bar load when the TV control board 2 outputs a 3D signal. FIG. 2 shows the dimming system of an example of the present disclosure. The light bar load comprises a light bar 4 and a converter 3. The converter 3 is coupled to an output end of the TV control board 2, and the TV control board 2 sends the 3D signal to the converter 3 when the TV control bar 2 feeds back the 3D signal to the power board 1. The converter adjusts the light bar 4 after the converter receives the 3D signal sent by the TV control board 2, then the converter feeds back an adjusted dimming signal to the power board 1. Because the TV control board 2 is directly coupled to the power board 1, the TV control board 2 feeds back the 3D signal to the power board when the TV control board 2 outputs the 3D signal. Thus, the power board 1 can receive the 3D signal sent by the TV control board 2 in advance, and adjust the output of the power board 1 in advance and an output voltage required by the light bar 4 without waiting to receive the dimming signal fed back by the converter 3 and then adjust the output of the power board.

FIG. 3 is a circuit diagram of a receiving output control structure of a power board of an example of the present disclosure. The power board comprises a first comparator U1A, a second comparator U2B, a third comparator U3B, and an output circuit formed by a fourth comparator U4B, a trigger and the like. An output end of the first comparator U1A and an output end of the second comparator U2B are coupled to an input end of the third comparator U3B, and an input end of the first comparator U1A is coupled to the TV control board. The rust comparator U1A receives the 3D signal sent by the TV control board 2 and outputs a first comparison signal according to a comparison of the 3D signal with one reference voltage VREF2. The second comparator U2B receives a dimming signal fed back by the converter 3 of the light bar load and outputs a second comparison signal according to a comparison of the dimming signal with another reference voltage VREF1. The first comparison signal and the second comparison signal are sent to two input ends of the third comparator U3B for comparison, then the third comparator U3B outputs a third comparison signal and sends the comparison signal to the output circuit to control output of the power board. The output circuit comprises a fourth comparator U4B coupled to an output end of the third comparator U3B, and a trigger coupled to an output end of the fourth comparator U4B. The third comparison signal is sent to the fourth comparator U4B and compared with a triangular wave signal, then the fourth comparator U4B outputs a trigger signal to the trigger that directly controls the output of the power board. In one example, the 3D signal is a high level/low level identification potential.

As shown in FIG. 2 and FIG. 3, the present disclosure further provides a dimming, method of a 3D TV dimming system, comprising the following steps: a TV control board 2 sending the 3D signal to a light bar load to dim the light bar load when the TV control board outputs a 3D signal feeds back the 3D signal to a power board 1. When signal input by the TV is a 3D signal, the TV control board 2 sends the 3D signal to the power board b the circuit. Thus, the power board 1 adjust response speed of the output of the power board in advance, which makes dynamic response speed of the power board 1 to be faster.

As shown in FIG. 2, in the TV dimming method of the example, the TV control board sends the 3D signal to the light bar load to dim the light bar load when the TV control board outputs a 3D signal and feeds back the 3D signal to the power board, and the power board adjust the output of the power board in advance to conform to an adjusted load.

The second example of the present disclosure is different from the first example in that: the TV control board sends the 3D signal to the power board when the TV control hoard outputs a 3D signal before the TV control board sends the 3D signal to the light bar load. By sending the 3D signal to the power board in advance, the power board can know change of the light bar load in advance, then the power board adjust the output of the power board in advance, which makes the dynamic response speed of the power board to be faster.

The present disclosure is described in detail in accordance with the above contents with the specific preferred examples. However, this present disclosure is not limited to the specific examples. For the ordinary technical personnel of the technical field of the invention, on the premise of keeping the conception of the present disclosure, the technical personnel can also make simple deductions or replacements, and all of which should be considered to belong to the protection scope of the present disclosure.

The invention claimed is:

1. A three-dimensional (3D) television (TV) dimming system, comprising:

a TV control board;

a light bar load controlled by the TV control board; and a power board that supplies power to the light bar load, wherein the TV control board is directly coupled to the power board and outputs a 3D signal that is fed back to the power board;

wherein the power board comprises a first comparator, a second comparator, a third comparator, and an output circuit; an output end of the first comparator and an output end of the second comparator are directly coupled to an input end of the third comparator; an input end of the first comparator is directly coupled to the TV control board, and an output end of the third comparator is directly coupled to an input end of the output circuit;

wherein the output circuit comprises a fourth comparator directly coupled to the output end of the third comparator, and a trigger directly coupled to an output end of the fourth comparator;

wherein the light bar load comprises a light bar and a converter; the converter is directly coupled to an output end of the TV control board, and the TV control board sends the 3D signal to the converter when the TV control board feeds back the 3D signal to the power board.

2. A three-dimensional (3D) television (TV) dimming system comprising:

a TV control board;

a light bar load controlled by the TV control board; and a power board that supplies power to the light bar load, wherein the TV control board is directly coupled to the power board and outputs a 3D signal that is fed back to the power board, wherein the power board comprises a first comparator, a second comparator, a third comparator, and an output circuit; an output end of the first comparator and an output end of the second comparator are directly coupled to an input end of the third comparator, an input end of the first comparator is directly coupled to the TV control board, and an output end of the third comparator is directly coupled to an input end of the output circuit.

3. The three-dimensional (3D) television (TV) dimming system of claim 2, wherein the output circuit comprises a fourth comparator directly coupled to the output end of the third comparator, and a trigger directly coupled to an output end of the fourth comparator.

4. The three-dimensional (3D) television (TV) dimming system of claim 2, wherein the light bar load comprises a light bar and a converter; the converter is directly coupled to an output end of the TV control board, and the TV control board sends the 3D signal to the converter when the TV control board feeds back the 3D signal to the power board.

5. The three-dimensional (3D) television (TV) dimming system of claim 2, wherein the 3D signal is a high level/low level identification potential.

6. A three-dimensional (3D) television (TV) dimming method, comprising:

outputting a 3D signal using a TV control board, where the TV control board sends the 3D signal to a light bar load to dim; and TV control board feeds back the 3D signal to a power board, wherein the power board comprises a first comparator, a second comparator, a third comparator, and an output circuit; the first comparator receives the 3D signal sent by the TV control board and outputs a first comparison signal according to a comparison of the 3D signal with one reference voltage; the second comparator receives a dimming signal fed back by the light bar load and outputs a second comparison signal according to a comparison of the dimming signal with another reference voltage; the first comparison signal and the second comparison signal are sent to two input ends of the third comparator for comparison, then the third comparator outputs a third comparison signal and sends the comparison signal to the output circuit to control output of the power board.

7. The three-dimensional (3D) television (TV) dimming method of claim 6, wherein the TV control board sends the 3D signal to the power board and the light bar load when the TV control board outputs the 3D signal.

8. The three-dimensional (3D) television (TV) dimming method of claim 6, wherein the TV control board outputs the 3D signal when the TV control board sends the 3D signal to the power board before the TV control board sends the 3D signal to the light bar load.

9. The three-dimensional (3D) television (TV) dimming method of claim 6, wherein the output circuit comprises a fourth comparator, and a trigger directly coupled to an output end of the fourth comparator; the third comparison signal is sent to the fourth comparator and compared with a triangular wave signal, then the fourth comparator outputs a trigger signal to the trigger that directly controls the output of the power board.

* * * * *